United States Patent [19]
Mah

[11] Patent Number: 6,134,826
[45] Date of Patent: Oct. 24, 2000

[54] ELECTRICAL INSECT TRAP FOR ATTRACTING, KILLING AND DISPOSING OF FLYING INSECTS

[76] Inventor: Pat Y. Mah, 1105 Sun Cheong Ind. Bldg, 2 Cheong Yee Street, Cheung Sha Wan, Kowloon, Hong Kong, China

[21] Appl. No.: 09/325,367

[22] Filed: Jun. 4, 1999

Related U.S. Application Data

[63] Continuation-in-part of application No. 09/255,944, Feb. 22, 1999, abandoned.

[51] Int. Cl.⁷ .................................................... A01M 1/22
[52] U.S. Cl. .................................... 43/112; 43/113; 43/99
[58] Field of Search ................................. 43/98, 99, 112, 43/113

[56] References Cited

U.S. PATENT DOCUMENTS

| | | |
|---|---|---|
| 1,713,557 | 5/1929 | Sauer . |
| 4,454,677 | 6/1984 | Chuang . |
| 4,914,854 | 4/1990 | Zhou ......................................... 43/112 |
| 5,274,949 | 1/1994 | Beaton ....................................... 43/113 |
| 5,301,456 | 4/1994 | Jobin ......................................... 43/113 |
| 5,323,556 | 6/1994 | Carle ......................................... 43/139 |

Primary Examiner—Jack W. Lavinder
Attorney, Agent, or Firm—Curtis L. Harrington

[57] ABSTRACT

A compact insect trapping appliance uses an efficient ultraviolet light mounted from underneath a protective dome to both attract insects and to enable the user to position the appliance to selectively direct the ultraviolet light in a desired direction, away from a line of sight of people near the appliance. The inner walls of the upper, partially open chamber carries a low voltage grid array for deleteriously affecting and disabling insects which alight on the inner walls of the upper chamber. This low voltage grid array produces a low voltage current, and acts fairly slowly and silently to disorient and disable the insect as it makes contact. Once the insect gets becomes sufficiently disabled, it will likely fall directly into, or by its own movements, slide into an entry hole of an conical surface and through a narrow neck of a sound suppression chamber within the appliance. A lower unit at the bottom of this sound suppression chamber, which may be configured in conjunction with a lower drawer, supplies an additional measure of energy to insure that the insect is dead. This lower unit may employ a combination of electrical current, electromagnetic energy, intermittent energy and heat.

19 Claims, 4 Drawing Sheets

ELECTRICAL INSECT TRAP FOR ATTRACTING, KILLING AND DISPOSING OF FLYING INSECTS

This is a continuation-in-part of copending U.S. patent application Ser. No. 09/255,944, filed on Feb. 22, 1999 now abandoned.

FIELD OF THE INVENTION

The present invention relates to the field of flying insect pest collection and elimination and more particularly to a compact, light weight, noiseless attracting trap for attracting, killing and cleanly disposing of flying insects.

BACKGROUND OF THE INVENTION

Conventional zapper-type devices have been used for some time in outdoor settings. Typically the device includes a light for attracting the bugs to a very high voltage grid system. The insects typically run into the grid while flying around the light and quickly and unexpectedly encounter a high voltage charge. When the insect makes contact between two of the electrodes of the grid, the insect experiences the sudden onslaught of current and heat. The insect is both boiled by the heating of his bodily juices and burned where there is no fluid to boil. This results in a "zap" sound which ranges from a loud pop to a pop and sizzle sound. This type of device is such that is necessarily used outdoors, typically in a cookout setting. The sounds provide an overbearing indication that the device is working and also has some entertainment value. The reason for predominant outside use is that (1) a high voltage source and grids are exposed and the device has to be mounted high enough that passersby would not normally be able nor tempted to touch it, (2) high voltage exposed grids may constitute a fire hazard if used inside, (3) the insects which are electrocuted either fall to the ground or in some cases burst into a flame with the accompanying smoke, (4) the noise level produced during operation would not be consistent with in-home use, and (5) the high voltage and current of the high voltage source, and the periodic drain on current would combine to cause significant interference if used near an appliance.

Of course, other types of insect trapping mechanisms are also commonly in use, including adhesive strips, fly paper, and the like. These structures usually include a sweetened scent which may also attract other insects such as ants and roaches. In addition, not all insects are attracted to sweet scents, such as mosquitos. Most of the sticky media or glue traps involve having to periodically change out the sticky material by disposing of it and purchasing more for reinstallation. In normal use, the need to change the material occurs where large numbers of insects cover the sticky surface so that other insects have no place to stick, or where the scent material has completely evaporated. So, when there is a high insect density, the sticky media traps may be used up much more rapidly than they can be replaced, and in low density areas, the sticky media is likely to be left hanging in place much longer than its ability to attract insects. Some devices use water to drown insects, but this too is messy and invites aquatic bacteria and vermin.

What is therefore needed is an insect trap which is safe, quiet and does not require changing of either the attractive media nor the capture media. The needed flying insect trap would be sanitary, and utilizable in hospitals, restaurants, and the home where it could be used for long periods of time with low maintenance. The needed home insect trap should work well in areas of high insect density as well as areas of low insect density. The disposal of the collected and killed insects should be had in an environmentally sound manner to eliminate having to generate paper and plastic waste in addition to the disposal of the bio-degradable insect remains.

SUMMARY OF THE INVENTION

A compact insect trapping appliance uses an efficient ultraviolet light mounted from underneath a protective dome to both attract insects and to enable the user to position the appliance to selectively direct the ultraviolet light in a desired direction, away from a line of sight of people near the appliance. The inner walls of the upper, partially open chamber carries a low voltage grid array for deleteriously affecting and disabling insects which alight on the inner walls of the upper chamber. This low voltage grid array produces a low voltage current, and acts fairly slowly and silently to disorient and disable the insect as it makes contact. Once the insect gets becomes sufficiently disabled, it will likely fall directly into, or by its own movements, slide into an entry hole of an conical surface and through a narrow neck of a sound suppression chamber within the appliance. An electrical plate at the bottom of this sound suppression chamber carries some finishing energy to insure that the insects are completely dead and easily disposed. A first embodiment of a preferred structure includes a small domed heated target which use a very little electricity due to its small size. The domed heated target is hot enough to quickly finish the demise of the insects which fall upon it. The heat drives off the water from the insect's body, making it amenable to long term clean storage. Because the dome is shallow in curvature, an insect falling on it will remain until dehydrated and knocked off by a subsequent heavier insect falling at a later time. A second embodiment includes an electrified grid, as a printed circuit board with closely spaced traces to provide a combination shocking energy and heating energy as needed. When the insect has just died, the water content of the body is high and the body, when electrocuted, conducts until the water is driven away and the body ceases to conduct. Subsequent insects falling on the electrified grid will displace the dehydrated bodies and the grid will continue to operate on subsequently falling insects. Other structures could include a pulsed control to periodically deliver a shorter duration, higher voltage charge to insure that there is periodic further disablement of the the insect's nerve system to further immobilize him, followed by a much longer period of relatively lower voltage for slight heating and driving off of water until the insect is dead and dehydrated. Thus, this higher voltage plate may employ a combination of stunning electrical current and lower voltage current to produce some heat, but which will not burn the insect in a burst, but insures that it will die over a longer period of time. A removal tray configured to partially surround and accommodate a support for either the heated dome or an electrified grid, preferably a printed circuit board, can still function to be slid open and its contents of insect bodies can be disposed of a trash can without having to make personal contact with the insect. Other killing mechanisms can be employed. Other techniques may be employed to both lure the insects to an external stunning/killing mechanism and then into an internal killing/dehydration mechanism, as well as structure which may combine both. For example, a mild vacuum system operating through a restricted venturi-type orifice could draw the insects from the attraction area and into a larger internal area. Due to the high inward air flow velocity through the inlet venturi, the insects cannot escape back through the small venturi. Because the air volume is low, silent operation is achieved.

BRIEF DESCRIPTION OF THE DRAWINGS

The invention, its configuration, construction, and operation will be best further described in the following detailed description, taken in conjunction with the accompanying drawings in which.

DETAILED DESCRIPTION OF THE PREFERRED EMBODIMENT

Figure 1:
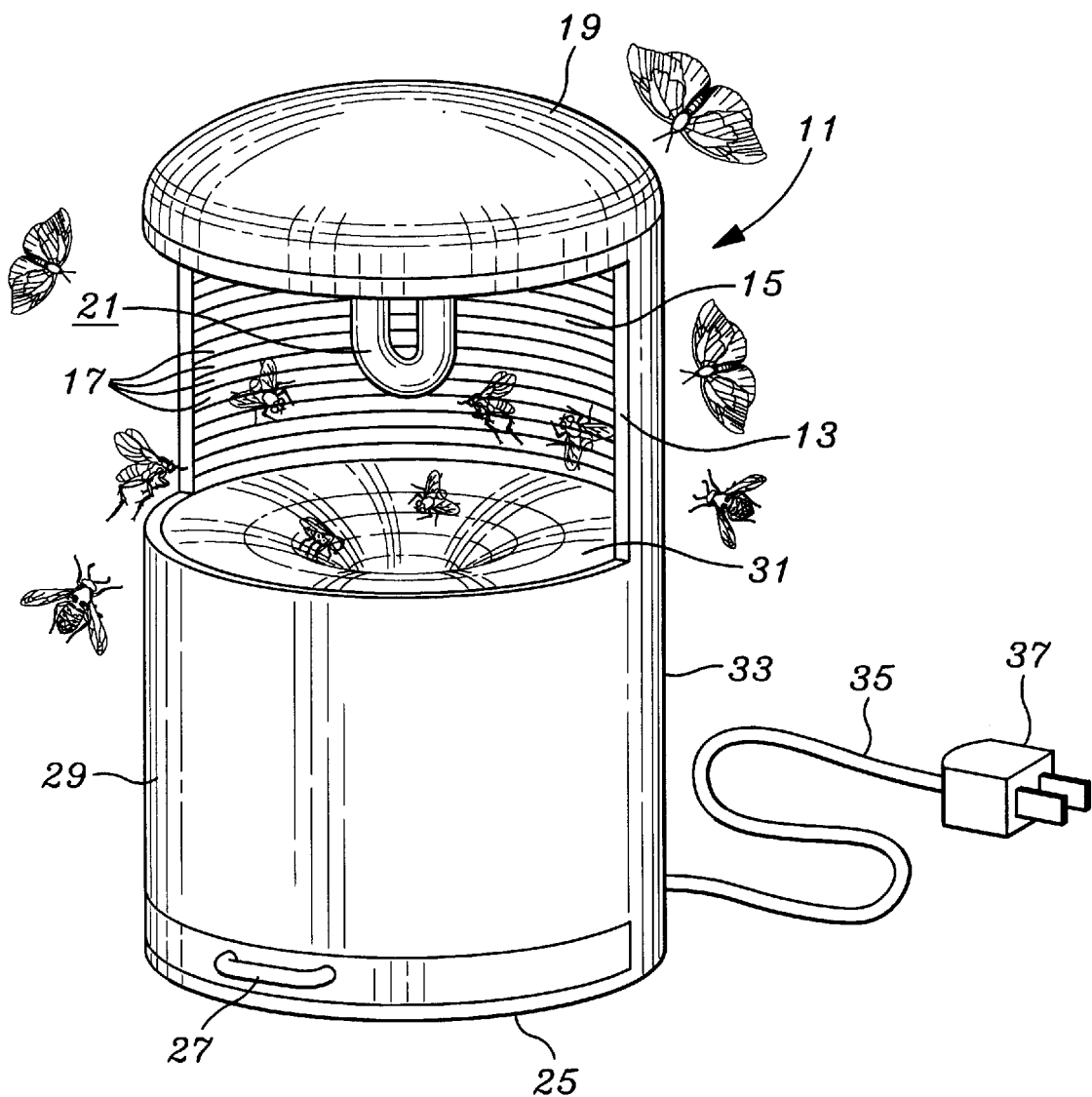
FIG. 1 is a perspective front view of the insect appliance of the invention and illustrating the dome mounted light, surrounding inside surfaces and funnel shaped entry to the bottom chamber and a bottom collection drawer in closed position.

The description and operation of the invention will be best initiated with reference to FIG. 1 and which illustrates a frontal view of a flying insect attraction, killing and collection appliance 11. The appliance 11 has an upper chamber 13 which is shown as being half open on a side facing the observer of FIG. 1. The appliance 11 upper chamber 13 has a back wall 15 which is seen as a cylindrical shape and a series of parallel horizontal, closely spaced conductors are seen as a grid 17. Grid 17 may preferably be a sheet of material reflectorized with embedded positive and negative conductive strips, such as copper strips, closely enough spaced so that electrical current is applied to the copper strips, the sheet of material is capable of disabling and causing disorientation to the insects when they land on the attractive reflective surface, which also serves to further attract the insects. The sheet of reflectorized material oriented so that the reflectorized surface is facing toward the center of the middle of the upper chamber 13.

Above the back wall 15 is a dome 19. Dome 19 is rounded and flatter than a hemisphere shape, and may range in shape from completely flat to more severely sharpened than hemispherical shape, such as rounded conical and the like. Dome 19 can be solid or opaque to further soften the re-transmission of light from within the chamber 13, if desired. At a position beneath the dome 19, a bulb 21 is suspended and electrically connected. Bulb 21 is shown as having a general "U" shape, but any bulb of any type capable of attracting flying insects is suitable. Ultra violet bulbs may be preferred so long as the intensity of the bulb 21 and location of the appliance 11 is not so as to annoy nearby people or to promote significant visual exposure to the bulb 21. Incandescent and fluorescent lighting can also be used, and the light source may be changed to optimally attract the type of flying insects posing the greatest pest problem.

At the lower front of the appliance 11 is a drawer 25 with center mounted drawer pull 27. The front of the drawer 25 generally follows the front surface 29 of the appliance 11 up to an opening of the upper chamber 13. Just above the uppermost extent of the front surface 29, a funnel shaped surface 31 is seen having a central aperture 33. The slope of the funnel or conical surface 31 is shown abbreviated so that the central aperture 33 can be seen at the angle of view of FIG. 1. The funnel or conical surface 31 can be more steeply sloped than shown in the drawing to insure that disabled flying insects falling from the back wall 15 will readily slide into the central opening 33. An electrical cord 35 with a plug 37 is shown, and it is expected that the appliance 11 will be electrically connected to a standard household outlet for extended periods of time. The central aperture 33 is designed to prevent any sounds of a live insect from passing through the central aperture 33 and attenuates such sound.

Figure 2:
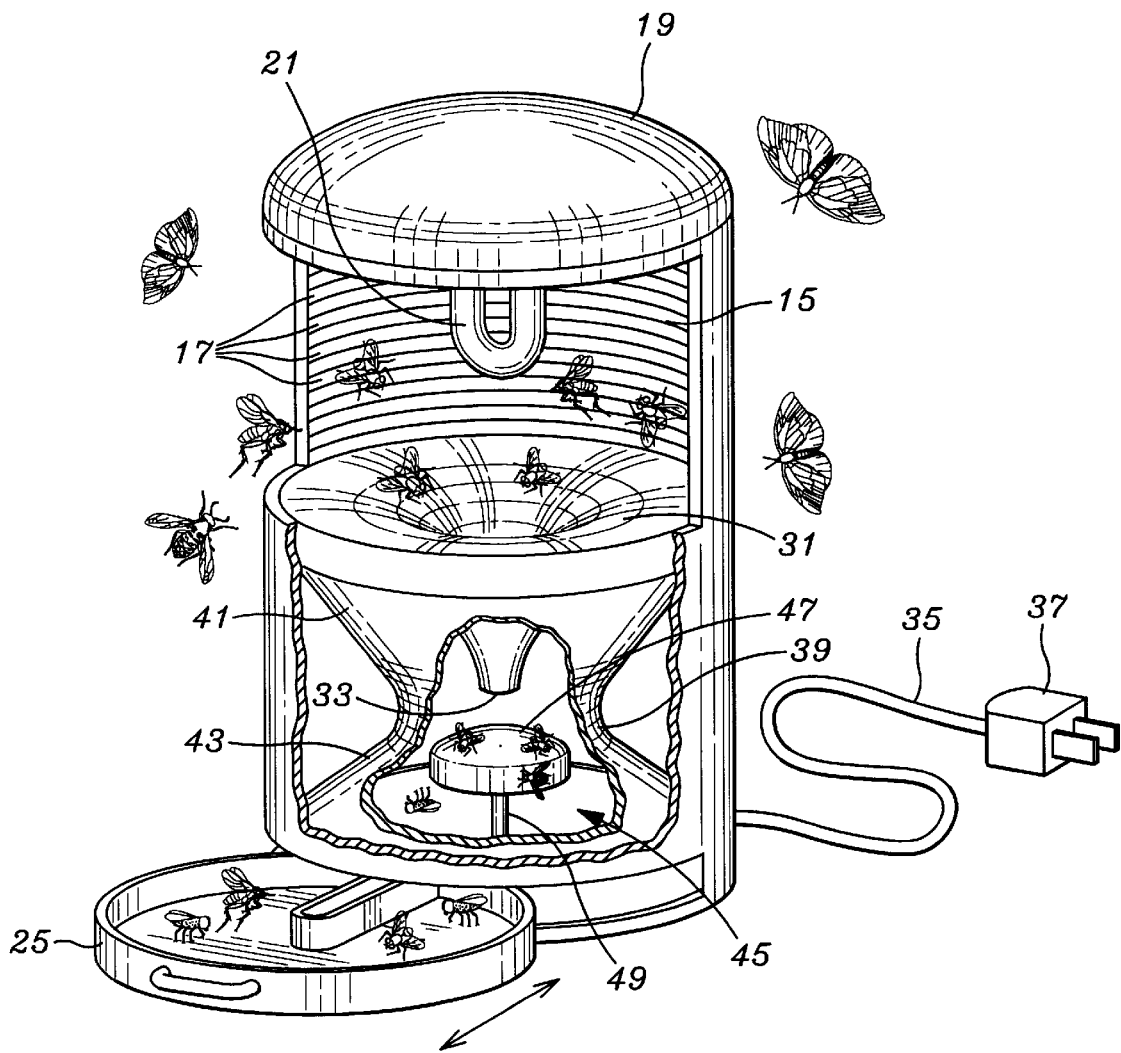
FIG. 2 is a sectional front view and illustrating the inside of the sound suppression chamber, the lower constricted neck of the sound suppression chamber and the sliding bottom collection drawer in open position.

Referring to FIG. 2, a sectional view with the front wall 29 removed illustrates that the conical or funnel shaped surface 31 overlies a chamber having a constricted neck portion 39 which partially divides an upper chamber 41 and a lower chamber 43. The lower chamber 43 serves several purposes. First, it muffles and attenuates the sound of an insect undergoing demise. Second, it reduces the probability of escape should an insect either miss the lower killing element, or simply fly into the upper opening.

A second lower unit 45 below the lower chamber 43 can provide additional killing energy for the flying insects which have fallen through the chamber 43. This lower unit 45 can be a high voltage pulsating unit, a heating unit, or a grid unit. The lower unit 45 in this case is a heated dome 47 supported by a columnar support 49. The tray or drawer 25 has a slot 51 having a pair of walls 53 to help isolate bug remains within the tray 25. In addition, the heated dome 47 may work in conjunction with, and may be located above or below the drawer 25. A combination of electrical conduction, electromagnetic field, intermittent electrical energization and resistance heating energy may be used to insure that the disabled insects will quietly be brought to complete demise.

Figure 3:
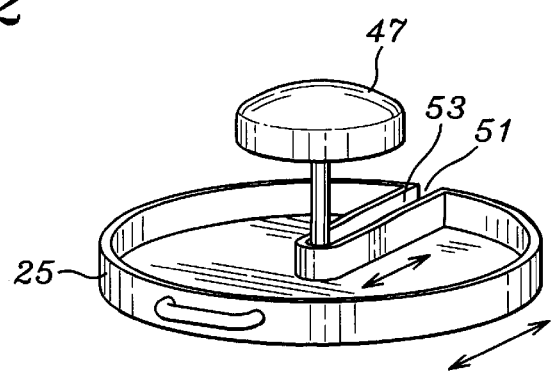
FIG. 3 is an isolated view of the dome and tray and the action of the tray motion about the dome support.
Figure 4:
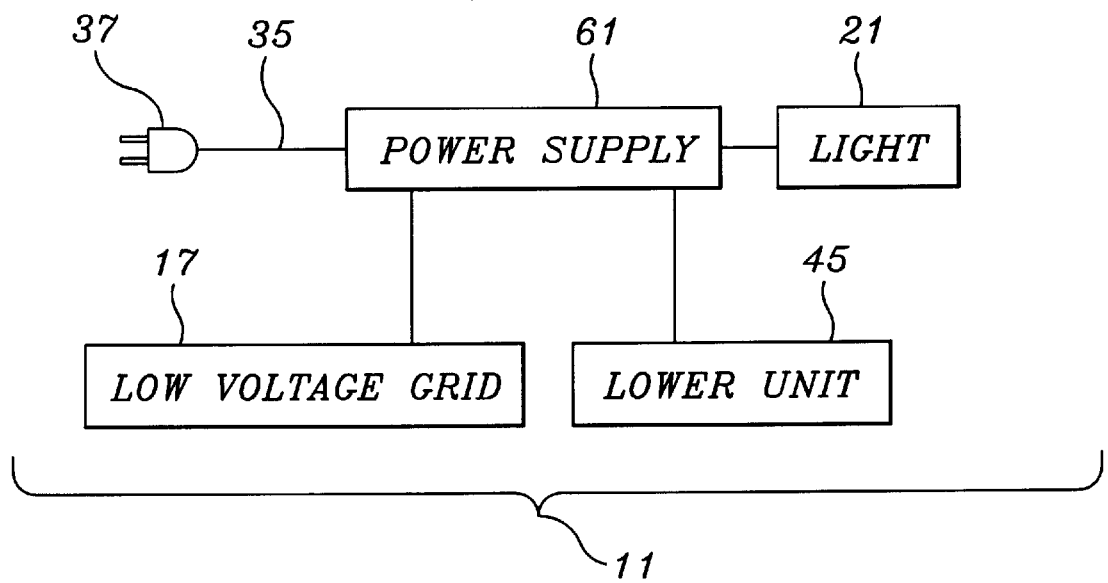
FIG. 4 is a block diagram and illustrating the relationship of a power supply to the light source, upper low voltage grid, and lower unit which imparts energy to the insects as electrical conduction, electromagnetic field, intermittent electrical energization and resistance heating energy to insure the insects' demise.

Referring to FIG. 3, a block diagram illustrating the operation of the appliance 11 is seen. A POWER SUPPLY 61 is connected to the plug 37 and cord 35 to receive power from a standard household alternating current electrical outlet. The POWER SUPPLY 61 converts the household alternating current to a low voltage power output connected to the low voltage grid 17 seen in FIG. 1. The POWER SUPPLY 61 also converts the household alternating current to a power level output connected to the heated dome 47 seen in FIG. 2, which may be electrical, electromagnetic, pulse or heat, and which may be used in conjunction with the drawer 25. Where the heated dome 47 is pulse or intermittent in terms of its energy, the power supply 61 will be regulated to provide such pulsing, or intermittent operation.

Figure 5:
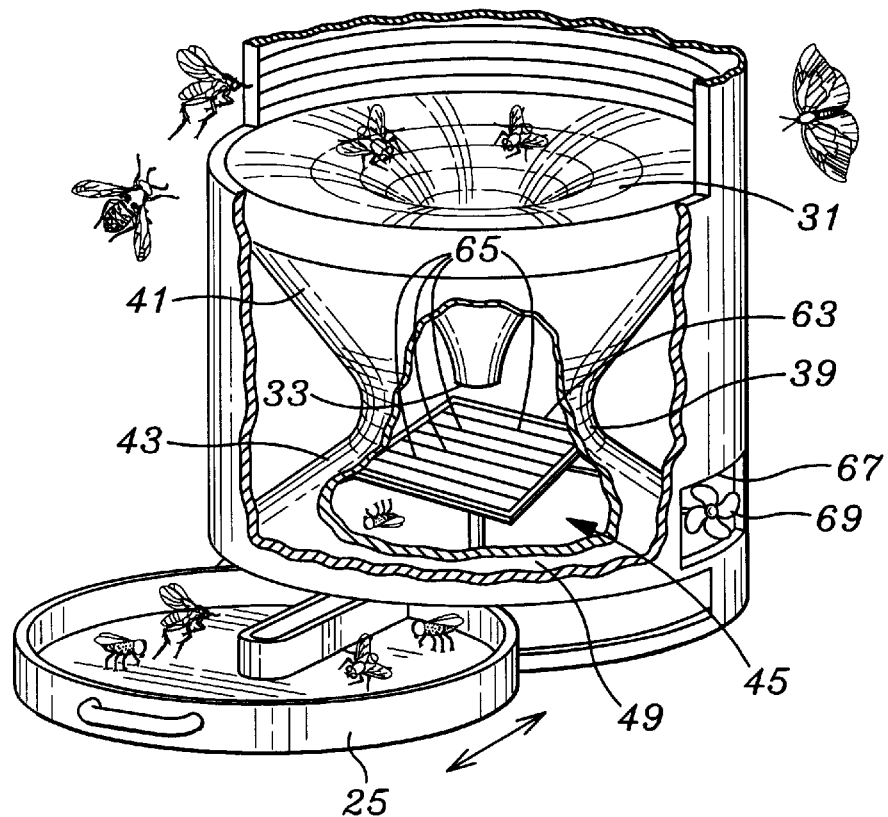
FIG. 5 is a view isolating on the partially broken away view of FIG. 2, but where an electrode surface is provided as a second lower unit place of a heating second lower unit seen in FIG. 2, and an optional exhaust fan.

Referring to FIG. 5, an isolated view of the broken away section seen in FIG. 2 illustrates the configuration of a second lower unit 45 as an electrified grid 63. Grid 63 may be realized in a variety of physical structures, but one structure which has worked well is a printed circuit board having a closely spaced grid array structure. The traces on the printed circuit board can be laid down very closely spaced without the unwanted possibility that the oppositely polarized adjacent structures will ground out either through production imperfections or through handling accidents. The configuration seen in FIG. 5 includes oppositely located end traces from which finger traces 65 extend past each other to create a grid where every other trace has opposite poliarity. In this configuration, the smallest portion of an insect which can connect two adjacent traces 65 can receive electrical current. The separation between adjacent traces 65 can be significantly smaller than one millimeter. Because circuit board technology is utilized, the structure of the electrified grid 63 can be varied and need not be flat. The grid 17 can also be realized by circuit board technology which may simply involve the selective etching away of a layer of conductor to leave grid traces, such as traces 65, behind.

Also seen in FIG. 5 is an optional exhaust fan 67 which includes a blade set 69 and which is preferably designed for near silent operation. An extended surface filter may cover the back end to insure that there are no significant obstructions. The exhaust fan 67 may be much larger to permit it to turn slower for a given air volume. Comparing the cross sectional area of the exhaust fan 67 with the cross sectional area of the central aperture 33 indicates that the highest velocity of air flow into the lower chamber 43 will be at the central aperture 33. An insect entering the lower chamber 43, even if it did not fall onto a second lower unit 45 and die would be hard pressed to fly out through the central aperture 33 against a significant volume of air flowing against it. Since the flying insect attraction, killing and collection appliance 11 is efficient in attracting and killing pests, but especially in insuring that the discarded pests in the drawer 25 are likely to be dehydrated and of the density of dust, a user will be able to continue operation of the flying insect attraction, killing and collection appliance 11 for a long time before having to empty the drawer 25 of discarded pests.

Figure 6:
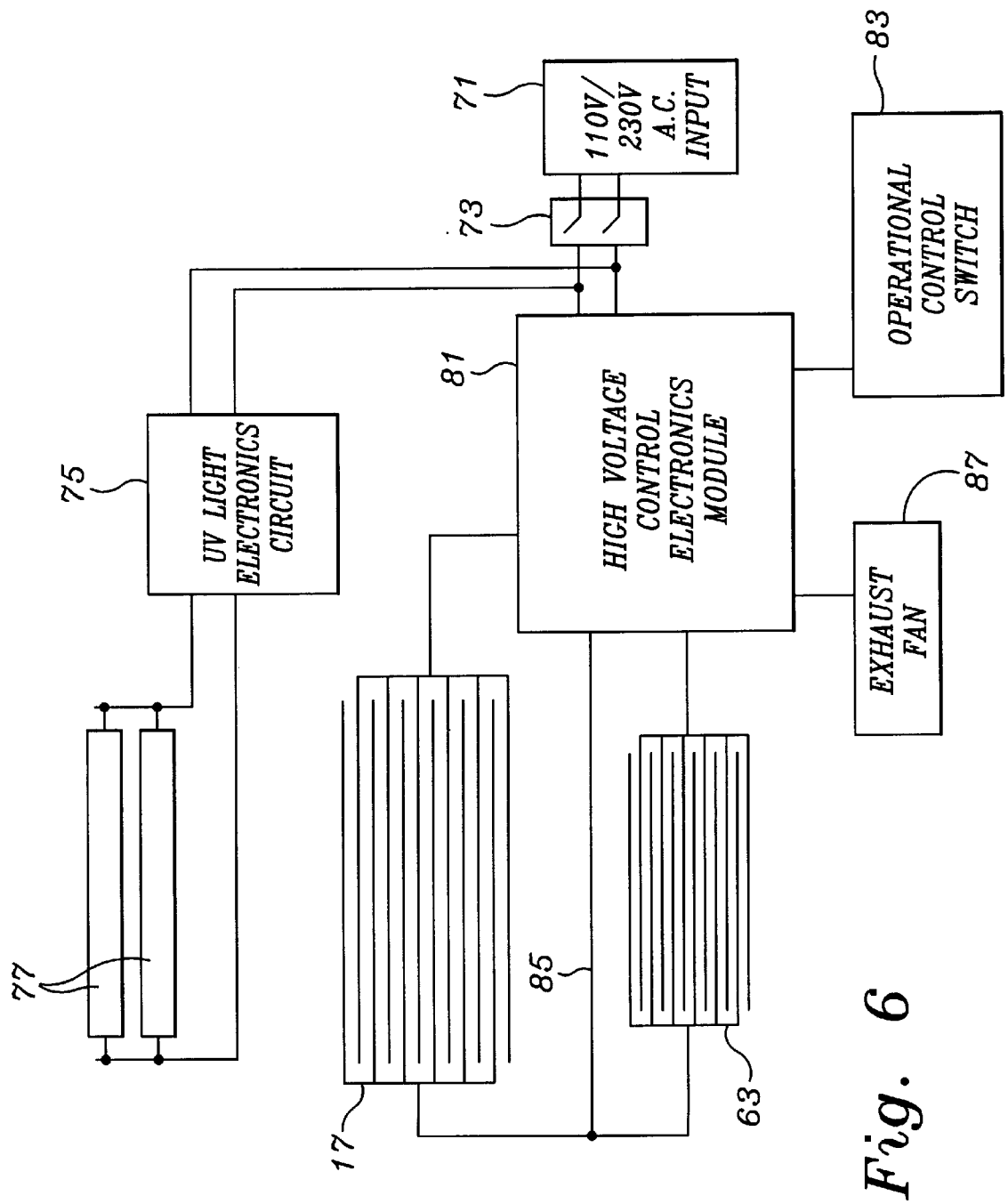
FIG. 6 illustrates a schematic block diagram which enables user selection of a higher voltage for flies or a lower voltage for mosquitoes.

Referring to FIG. 6, a block schematic diagram illustrating a more detailed operational structure of the flying insect attraction, killing and collection appliance 11 is seen. At the right of the schematic a power supply of either 110 volts or 230 volts alternating current is available at a 110V/230V A.C. IN block 71. The input power may pass through a switch 73 where a provision is made for the user to turn the device off, especially during extended absenses from home. The switchable power is made available to a UV LIGHT ELECTRONICS CIRCUIT block 75, and then to a pair of ultraviolet lights 77, which may preferably be a pair of eight inch lights. A pair of lights 77 may be provided so that if one fails through normal use, the flying insect attraction, killing and collection appliance 11 will keep working with the other light while a replacement bulb is obtained.

The switchable power is also made available to a HIGH VOLTAGE CONTROL ELECTRONICS MODULE 81. An OPERATIONAL CONTROL SWITCH block 83 may be provided to control the HIGH VOLTAGE CONTROL ELECTRONICS MODULE 81 to output a high voltage of about 500 volts where the capture and killing of mosquitoes is the main mode of operation and to output a high voltage of about 700 volts where the capture and killing of flies is the main mode of operation. In general, the mosquito mode will be the night mode and the fly mode will be the daytime mode. A common ground wire 85 is connected to the HIGH VOLTAGE CONTROL ELECTRONICS MODULE 81 and connected to the grid 17, which is preferably an external high voltage printed circuit board, and to the internal electrified grid 63, which is also preferably a high voltage printed circuit board only one embodiment of which is seen in FIG. 5. Grid 17 is connected to HIGH VOLTAGE CONTROL ELECTRONICS MODULE 81 through one separate connection, while the internal electrified grid 63 is connected to HIGH VOLTAGE CONTROL ELECTRONICS MODULE 81 through another connection. In this configuration, the voltages of both the grids 17 and 63 may be independently controlled at any voltage. Further, the HIGH VOLTAGE CONTROL ELECTRONICS MODULE 81 can also control the time of energization of the grids 17 and 63. For example, it can provide full voltage pulses for one tenth of a second each alternating with rest periods of one tenth of a second each, especially where it is desired to conserve energy. The control of the operational duty cycle may also be effected through the OPERATIONAL CONTROL SWITCH 83. The HIGH VOLTAGE CONTROL ELECTRONICS MODULE 81 may also preferably contain feedback circuitry for safety. Where a lot of flies are providing multiple conductivity between the conductors of the grid, the HIGH VOLTAGE CONTROL ELECTRONICS MODULE 81 can control the voltage downwardly, or provide for pulsing the voltage in order to conserve energy, avoid overheating, and for achieving other goals. Inputs into the HIGH VOLTAGE CONTROL ELECTRONICS MODULE 81 to enable more precise control may include a voltage feedback, a current feedback, temperature feedback, and others. The use of pulse voltage to provide a stun, followed by a lower voltage electrocution/heating mode might be helpful for the grid 63. A pulsed high voltage mode of operation might also be helpful for grid 17. Dropping the duty cycle for grid 17 to half would not impede its performance and would conserve energy. The optional EXHAUST FAN block is also seen connected to the HIGH VOLTAGE CONTROL ELECTRONICS MODULE 81 where this option is utilized. A stream of air passing through the central aperture 33 would also help to clear dehydrated insect bodies off of the second lower unit 45.

While the present invention has been described in terms of an electrical insect trap for attracting, killing and disposing of flying insects, the principles contained therein are applicable to the attraction and capture of other living creatures.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A flying insect elimination appliance comprising:

a housing including an open upper chamber;

a light radiation source supported within said open upper chamber and supported by said housing;

means for supplying electrical power to said light radiation source, and supported by said housing;

holder means, detachably connected to said housing, for collecting and containing said disabled insects;

disabling means, supported by said housing, and at least partially surrounding said upper chamber and having a surface in a position to be illuminated by said light radiation source for disabling insects by electrical conductance, and wherein said disabling means by electrical conductance further comprises a sheet of material embedded with positive and negative conductive strips closely enough spaced so that electrical current can be applied to the conductive strips to disable and disorient insects which land on said sheet of material; and trapping means, supported by said housing for directing disabled insects into said holder means and located underneath a lowermost extent of said disabling means.

2. The flying insect elimination appliance as recited in claim 1 wherein said light radiation source outputs ultraviolet radiation.

3. The flying insect elimination appliance as recited in claim 1 wherein said housing is cylindrically shaped and has an upper rounded surface.

4. The flying insect elimination appliance as recited in claim 3 wherein said light radiation source is within an open upper chamber within said housing and supported from underneath said upper rounded surface.

5. The flying insect elimination appliance as recited in claim 1 wherein said trapping means further comprises a downwardly sloped funnel shaped surface having a central opening through which said disabled insects are directed.

6. The flying insect elimination appliance as recited in claim 1 and further comprising an electrically powered lower unit, adjacent said holder means and utilizing at least one of electrical conduction, electromagnetic field, intermittent electrical energization and electrical heating to bring disabled insects to complete demise.

7. The flying insect elimination appliance as recited in claim 1 wherein said holder means further comprises a sliding drawer located below said trapping means to facilitate disposal of said disabled insects.

8. A flying insect elimination appliance comprising:
a housing including an open upper chamber;
a light radiation source supported within said open upper chamber and supported by said housing;
means for supplying electrical power to said light radiation source, and supported by said housing;
holder means, detachably connected to said housing, for collecting and containing said disabled insects;
disabling means, supported by said housing, and at least partially surrounding said upper chamber and having a surface in a position to be illuminated by said light radiation source for disabling insects by electrical conductance;
trapping means, supported by said housing for directing disabled insects into said holder means and located underneath a lowermost extent of said disabling means, and wherein said trapping means further comprises a downwardly sloped funnel shaped surface having a central opening through which said disabled insects are directed; and
a sound suppression chamber, located under said downwardly sloped funnel shaped surface having a central opening and including a constricted neck portion providing partial separation between an upper chamber and a lower chamber.

9. An insect elimination appliance comprising:
a housing having an upper chamber open to receive attracted insects, and a collection space;
a plurality of positive and negative conductors, within said upper chamber and closely enough spaced so that electrical current can be applied to the conductive strips to disable and disorient said attracted insects, wherein said plurality of positive and negative conductors further comprises a sheet of material embedded with positive and negative conductive strips;
a light radiation source supported within said upper chamber and positioned to illuminate at least one of said collection space and said plurality of positive and negative conductors; and
a power supply connected to said plurality of positive and negative conductors and to said light radiation source.

10. The flying insect elimination appliance as recited in claim 9 wherein said light radiation source outputs ultraviolet radiation.

11. The flying insect elimination appliance as recited in claim 9 wherein said housing is cylindrically shaped and has an upper rounded surface.

12. The flying insect elimination appliance as recited in claim 11 wherein said light radiation source is supported from underneath said upper rounded surface.

13. The flying insect elimination appliance as recited in claim 9 and further comprising an electrically powered lower unit, electrically connected to said power supply and utilizing at least one of electrical conduction, electromagnetic field, intermittent electrical energization and electrical heating to bring disabled insects to complete demise.

14. The flying insect elimination appliance as recited in claim 9 wherein said collection space further comprises a sliding drawer at a lower portion of said collection space to facilitate disposal of said disabled insects.

15. A flying insect elimination appliance comprising:
a housing having an upper chamber open to receive attracted insects, and a collection space;
a plurality of positive and negative conductors, within said upper chamber and closely enough spaced so that electrical current can be applied to the conductive strips to disable and disorient said attracted insects, wherein said plurality of positive and negative conductors further comprises a sheet of printed circuit board material onto which said positive and negative conductive strips are formed as circuit traces;
a light radiation source supported within said upper chamber and positioned to illuminate at least one of said collection space and said plurality of positive and negative conductors; and
a power supply connected to said plurality of positive and negative conductors and to said light radiation source.

16. The flying insect elimination appliance as recited in claim 15 wherein said collection space means further comprises a downwardly sloped funnel shaped surface having a central opening through which said disabled insects are directed.

17. The flying insect elimination appliance as recited in claim 15 and wherein said collection space further comprises a sound suppression chamber, located under said downwardly sloped funnel shaped surface having a central opening and including a constricted neck portion providing partial separation between an upper chamber and a lower chamber.

18. The flying insect elimination appliance as recited in claim 17 and further comprising an exhaust fan in communication with said suppression chamber collection space for creating an air flow barrier to prevent insects from escaping through said central opening.

19. A insect elimination appliance comprising:
a housing having an upper chamber open to receive attracted insects, and a collection space;
a plurality of positive and negative conductors, within said upper chamber and closely enough spaced so that electrical current can be applied to the conductive strips to disable and disorient said attracted insects;
a light radiation source supported within said upper chamber and positioned to illuminate at least one of said collection space and said plurality of positive and negative conductors; and
a power supply connected to said plurality of positive and negative conductors and to said light radiation source.

* * * * *